May 11, 1965  H. L. CARPENTER ET AL  3,182,571
METHOD OF MANUFACTURING PLASTIC LINED FIBER CONTAINERS
Original Filed Oct. 27, 1961  3 Sheets-Sheet 1
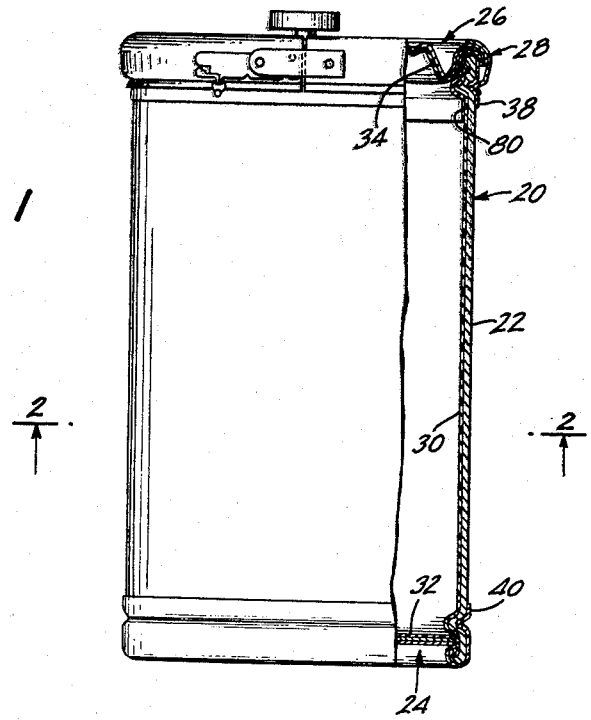
FIG. 1
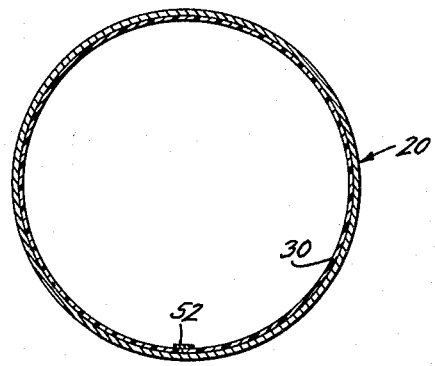
FIG. 2
FIG. 3
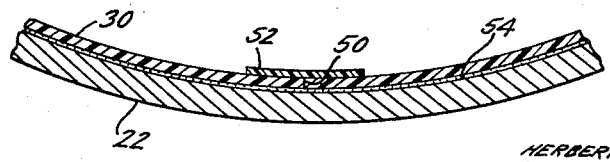
INVENTORS
HERBERT L. CARPENTER
HERBERT L. CARPENTER, JR.
BY
Kane, Palsimer and Kane
ATTORNEYS May 11, 1965 H. L. CARPENTER ET AL 3,182,571
METHOD OF MANUFACTURING PLASTIC LINED FIBER CONTAINERS
Original Filed Oct. 27, 1961 3 Sheets-Sheet 2
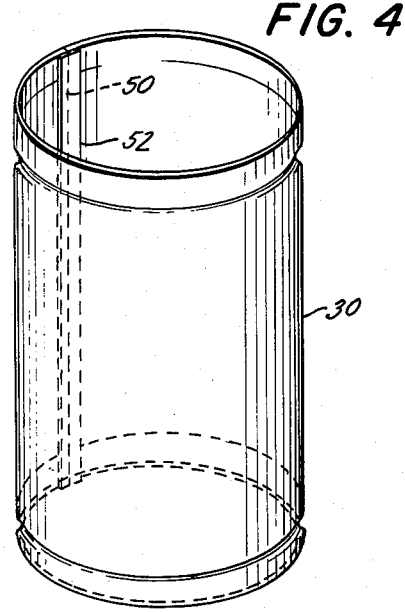
FIG. 4
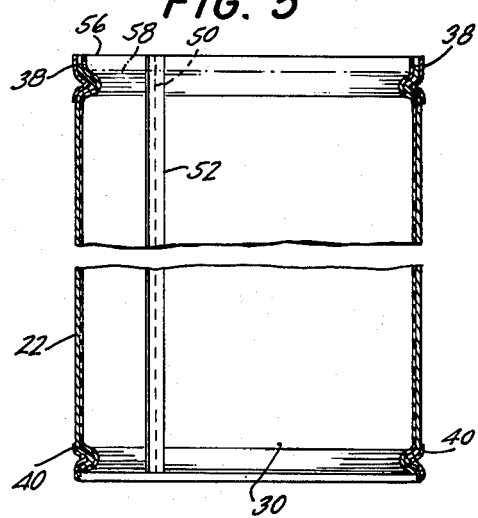
FIG. 5
FIG. 6
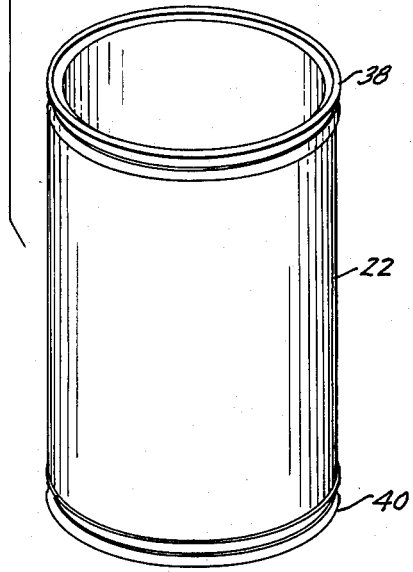
FIG. 7
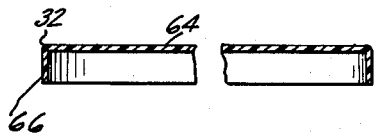
INVENTORS
HERBERT L. CARPENTER
HERBERT L. CARPENTER, JR.
BY
Kane Dalsimer and Kane
ATTORNEYS

United States Patent Office 3,182,571
Patented May 11, 1965

3,182,571
METHOD OF MANUFACTURING PLASTIC LINED FIBER CONTAINERS
Herbert L. Carpenter, Amityville, and Herbert L. Carpenter, Jr., Babylon, N.Y., assignors to The Greif Bros. Cooperage Corporation, Delaware, Ohio, a corporation of Delaware
Original application Oct. 27, 1961, Ser. No. 148,247, now Patent No. 3,116,001, dated Dec. 31, 1963. Divided and this application July 12, 1963, Ser. No. 299,135
11 Claims. (Cl. 93—55.1)

This application is a division of application Serial Number 148,247 filed October 27, 1961, now Patent No. 3,116,001.

This invention relates to plastic-lined containers and more particularly to plastic-lined fiber containers as well as their method of manufacture whereby liquids and semi-liquids are most effectively stored and shipped therein.

At the present time it is common practice to ship and store bulk material of liquid or semi-liquid form in plastic-lined fiber drums ranging in size up to and beyond 55 gallons in capacity. These drums are relatively speaking inexpensive and light in weight but must be of such a nature to adequately withstand the expected use and abuse. Leakage or contamination of the drum contents should not occur under the contemplated conditions.

However, plastic liners now in use are usually associated with a disk-type of plastic base forming part of the bottom closure wherein a seam is inevitably created at the juncture of the plastic parts. The presence of this seam produces a point of weakness at which rupturing will occur, if the lining is to fail, thereby rendering it pervious.

A number of lined fiber drums additionally enclose a metallic chime strip at the drum upper end. In the case of corrosive liquids, chemicals and other products, in the drum, the metal chime strip would oftentimes be attacked or degraded. Similarly, the metallic chime strip would be obnoxious to or incompatible with the contained substance but nevertheless be exposed thereto because of faulty drum construction or seam failure at or near the top closure.

An important object of our present invention is to correct the disadvantages of prior art lined drums by providing a superior liquid tight seam between the bottom closure and shell by effectively sealing the junction between the lining of the bottom and shell and extending it into the lower bead of the drum so that during handling, shipping and storage, and the use and abuse incident thereto, the lining at the bottom chime will remain impervious.

Another object is to provide a plastic-lined fiber drum utilizing a preformed lining strip for protecting the metallic chime usually appearing at the upper end of such drums, from contact with the contained material and simultaneously cooperates in providing a superior seal with a top closure.

A further object is to provide an economically constructed plastic-lined fiber drum which may be readily manufactured and at the same time meet the standards and specifications of the various rules and regulations governing the shipment of liquids and semi-liquid materials in fiber drums which are substantially liquid-tight, impervious to contaminating surroundings, and which possesses substantially no weak spots or zones that would increase the danger of rupture of the hermetic seal thus provided by the liner.

In accordance with the present invention, plastic-lined drums are manufactured by initially providing a tubular shell made from laminated layers of fibrous material open at both of its ends. Reinforcing metal chime strips are exteriorly mounted at both ends of the shell and as is usual practice, external grooves and internal shoulders are then formed at both ends to extend completely around the circumference of the shell a short distance from the respective peripheral edges. A predetermined length of liner sheet material is inserted within the confines of the shell and, because of the inherent flexibility and elasticity, is made to conform and follow the contours of the shell interior. The longitudinally extending seam of the liner side walls is secured by application of length of tape suitable for such purposes. In the event, trimming of the top and bottom of the liner side walls is necessary or desirable, such can be accomplished at this time. In forming the bottom closure, a plastic head is employed having a substantially disk shaped body portion from the periphery of which extends a depending apron. The bottom closure is placed across the lower open end of the shell such that the plastic head rests upon the internal shoulder at this end and the apron is against the liner side walls. The bottom bead construction is then fabricated, wherein an inturned bead is formed that interlocks the lower peripheral associated edges of the plastic apron and liner, and is protected by the reinforcing lower metallic chime strip. The associated lower peripheral sectors of the depending apron and liner are heat sealed to one another to strengthen and unite the juncture therebetween. Accordingly, a substantially leakproof and impervious bottom chime construction is thus created that effectively resists severe handling and the contemplated forces and pressures.

In forming the top chime construction of the contemplated leakproof plastic-lined fiber drum, a preformed lining strip is mounted on the upper end of the shell subsequent to the formation of the top inturned bead. This lining strip will rest upon the liner side walls over the upper internal shoulder and extend over the inner and upper zones of the metallic chime strip as well as a section of the upper and outer zones of the metallic chime strip short of the external groove therein. The lower peripheral edge portion of the lining strip is then heat sealed to the associated surfaces of the liner side wall to seal the juncture therebetween.

In addition, when employing a top cover or closure, having a plastic lining seal, the outer peripheral head section of the lining strip is then heat sealed to the lining seal of the cover to effectively seal this seam and thereby provide a substantially hermetically sealed and leakproof lined fiber drum of superior construction.

Other objects and advantages will become apparent from the detailed description of the invention which is to be taken in conjunction with the accompanying drawings showing a somewhat preferred embodiment thereof, and in which:

FIG. 1 is an elevational view wtih certain parts broken away and removed of a plastic-lined fiber drum fabricated in accordance with the present invention and having a cover with a central filler and emptying aperture and cap therefor secured in place by means of a locking rim assembly;

FIG. 2 is a cross-sectional view of the drum taken along the line 2—2 of FIG. 1;

FIG. 3 is an enlarged fragmentary sectional view particularly showing the taped seam of the liner side walls together with the layer of adhesive interposed between the liner and fiber shell;

FIG. 4 is an exploded perspective view of a fiber shell on the one hand and the contained plastic liner for the side walls on the other, with the fiber shell having top and bottom metallic chime strips and the shell and chime strips being contoured so as to provide an external groove and internal shoulder;

FIG. 5 is a longitudinally extending sectional view of the assembled fiber shell and liner of FIG. 4;

FIG. 6 is a fragmentary sectional view of the upper lining strip employed to complete the drum top closure;

FIG. 7 is a fragmentary sectional view of the plastic head incorporated into the bottom closure in forming the bottom chime construction and rendering it substantially leakproof;

Figure 8:
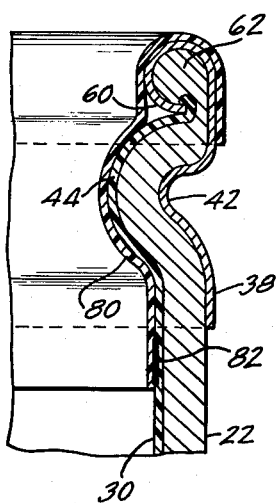
FIG. 8 is an enlarged fragmentary sectional view of the top bead construction of the drum having associated therewith the upper lining strip.

In the accompanying drawings, we have shown a fiber drum 20, fabricated in accordance with the present invention, having a tubular shell 22, which may be of any cross-sectional shape and which is preferably made from convolutely wound laminated layers of fibrous material such as kraftboard, fiberboard, or the like. The fiber shell 22 is usually made by winding a sheet of kraftboard around a mandrel with suitable adhesives coating the surfaces of the board and permeating the pores and fibers thereof. The bottom end of the shell 22 is provided with a permanently attached closure 24 and the upper end with a removable cover 26 constituting one of the number of upper closures that may be incorporated along with our drum. The illustrated cover may be of the conventional steel variety which is ordinarily releasably locked in place by means of a locking rim assembly 28, which may be of the type disclosed in our commonly assigned U.S. Patent No. 2,884,176 granted April 28, 1959, and U.S. Patent No. 2,966,378 granted December 27, 1960. As illustrated, a centrally located filling and emptying screw fitting and cap may project from the top closure 26. A filling fitting and vent fitting in most cases will be somewhat recessed in the top closure 26.

The interior of the shell 22 is lined with a plastic liner 30, fabricated from sheet material and constituting the side walls of the lining. At the base of the drum 20, a plastic head 32 forms part of the bottom closure 24 and forms an impervious seam with the side walls of liner 30. In order to complete the seal for the interior of the drum 20 in accordance with the illustrated embodiment, the cover 26 may be provided with a preformed cover seal 34 also fabricated from a suitable resinous material and which cooperates in providing a substantially leakproof top closure by cooperating with a lining strip 80. This lining strip is preferably preformed for intimate association with the upper end of the drum 20 as shown.

The end portions of the drum 20 may be strengthened in the usual manner by providing upper and lower metal reinforcing chimes 38 and 40 around both the upper and lower ends respectively of the shell 22.

The liner 30 constituting the side walls of the illustrated embodiment is fabricated from a thermoplastic material provided in sheet form. The material selected will have the desired characteristics proven by the intended use of the finished drum 20 and the nature of the liquid or semi-liquid substance to be contained therein. In this connection, consideration will be given to the material's substantial imperviousness, chemical inertness, tensile strength, non-toxicity and its potential detrimental effects on the contained substances which may include chemicals, combustibles, comestibles, or food products. Thermoplastic materials that may be utilized include polyethylene, polypropylene, nylon, and the like, to mention a few. In this connection, similar material considerations must be given to the selection and employment of the cover seal 34 and bottom plastic head 32 as will become eventually apparent.

In forming the chime reinforced drum 20, the chime strips 38 and 40 are initially placed around the fiber shell 22. To this end, the upper chime strip is fitted tightly around the shell and extends from a short distance below the upper end upwardly, overlapping the top. At the same time, it projects downwardly for a short distance into the interior of the shell as shown most clearly in FIG. 5. A short distance from the upper end of the shell 22 the fiber body and the metal reinforcing chime 38 is deformed inwardly so as to provide an external groove 42 and internal shoulder 44.

Similarly, the bottom reinforcing chime 40 is initially placed around the lower end of the shell 22, but merely overlaps the peripheral edge thereof. The bottom chime strip 40 and fiber body are then deformed to provide the external groove 46 and internal shoulder 48. The foregoing association of the chime strips 38 and 40 with the fiber shell 22 is more fully disclosed in our prior U.S. Patent No. 2,884,176 granted April 28, 1959.

The fiber shell 22, with its tightly fitting upper and lower reinforcing chimes 38 and 40 is now prepared to receive the lining 30. Under such circumstances, the sheet material from which the liner 30 is formed will be of a sufficient length depending upon the size of the finished drum 20 and shell 22 to provide a butt joint, defining a longitudinally extending seam 50. In this connection, reference is made to FIG. 5 wherein it will be noted that due to the flexibility and resiliency of the thermoplastic material employed, the liner 30 will conform to the contours of the shell interior substantially as illustrated. The seam 50 is then sealed by means of an adequate length of tape 52 by heat sealing or suitable adhesive. The application of such tape over a seam of a plastic lining, of the type disclosed, is common-place in the art.

In order to anchor the liner 30 within the drum and to the inner walls of the shell 22, a compatible adhesive 54 is interposed between the liner 30 and the shell 22, as clearly shown in FIG. 3. Adhesives of this nature are well known in the art.

The top chime construction may now be completed. Initially, the upper liner section 56 is removed by trimming along line 58, either manually or automatically, radially inwardly from the inner peripheral end of the upper chime strip 38. In this connection, the downturned inner peripheral edge of the upper chime strip 38 is designated by numeral 60 and in the embodiment disclosed is slightly spaced from associated surfaces of the upper end of the fiber shell 22. Accordingly, following the removal of the upper liner section 56, the upper peripheral edge of the liner 30 may be readily forced into the existing crevice between the chime and inner face of the shell. A rounded bead 62 is then formed and with the same operation the inner periphery 60 of the upper chime strip 38 is curved downwardly and inwardly so as to encase and pocket the bead. As will be clearly observed in FIG. 8, the upper end of the liner side wall 30 embraces the inner peripheral edge 60 of the chime strip 38 and at the same time is embedded in the bead to provide an effective seal to thereby prevent undesirable penetration of the contents of the ultimately formed fiber drum 20 through the fibrous side walls at this juncture. For details and an acceptable technique of completing the top chime construction, reference is made to our U.S. Patent No. 2,884,176 granted April 28, 1959.

A bottom reinforcing chime construction may be similarly completed in accordance with the teachings of this patent. The bottom closure, however, will include the preformed plastic head 32 having a central disk-shaped portion 64 and a laterally extending depending apron 66. As shown, the corner defined by the disk-shaped portion 64 and apron 66 is placed against the internal shoulder 48 through the interposed liner 30. The apron 66, on the other hand, is in direct surface-to-surface contact with the base of the liner 30 and may, at this time or at any point prior to the formation of the bottom bead, be heat sealed to the liner along the zone 68 to hermetically close their juncture. In this connection, the plastic head 32 should be of a compatible material for such purposes and when the liner 30 is formed from a thermoplastic material should itself be a compatible thermoplastic. To complete the bottom closure 24, a cushioning bottom spacer 70 is placed in engagement with the bottom face of the disk portion 64. An outer reinforcing fiber layer 72, also cupped shaped and having an annular depending apron 74, covers the outer face of the spacer while its depending apron bears against the apron 66 of the plastic head 32.

Figure 10:
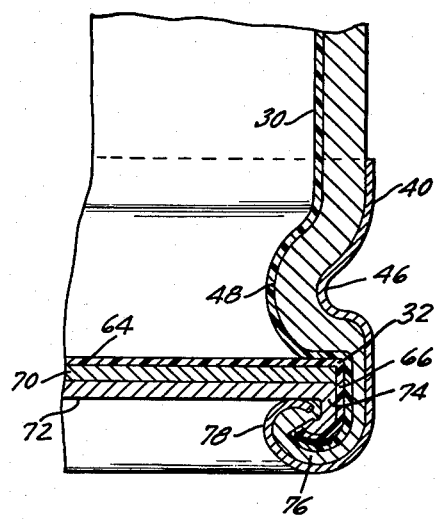
FIG. 10 is a similar fragmentary sectional view following the formation of the bottom bead and chime construction.

The finished bottom chime construction is illustrated in FIG. 10 and will include the bead 76 encased and protected by the inner peripheral edge 78 of the bottom chime strip 40 which is pressed so as to be curved upwardly and inwardly. As illustrated, the plastic head 32, spacer 70 and the outer fibrous cup 72 will be firmly retained between the inner peripheral edge 78 of the bottom chime strip 40 and the internal shoulder 48 of the fiber shell 22. The aprons 66 and 74, together with the associated sectors of the base of the liner 30, will be interlocked within the bead 76 as shown in FIG. 10. Thus it should be apparent that a liquid-tight seal is provided at the bottom chime construction; and through the employment of the heat sealed zone 68, this seal will be maintained notwithstanding severe handling of a drum 20 and applied pressures to the bottom chime strip 40.

In completing the top closure for the drum 20, we provide a preformed plastic lining strip 80 which will conform to the chime reinforced beaded upper end of the drum 20. Thus the lining strip 80 will follow the contours of the shoulder 44 through the underlying upper portion of the plastic liner 30 as shown and then the uppermost portion of the metallic chime strip 38 as well as its outer surface short of the external groove 42 thereof. The lining strip 80 will consequently protect those portions of the metallic chime strip 38 that may ultimately come in contact with the drum 20 to either corrode the metal or injuriously affect the contents. In order to further assure this end result, the lower periphery of the lining strip 80 is heat sealed to the associated sections of the liner 30 along the zone 82. For this reason the material from which the lining strip 80 is fabricated should be compatible with that employed for the liner 30 and to this end may be of the thermoplastic variety.

Figure 11:
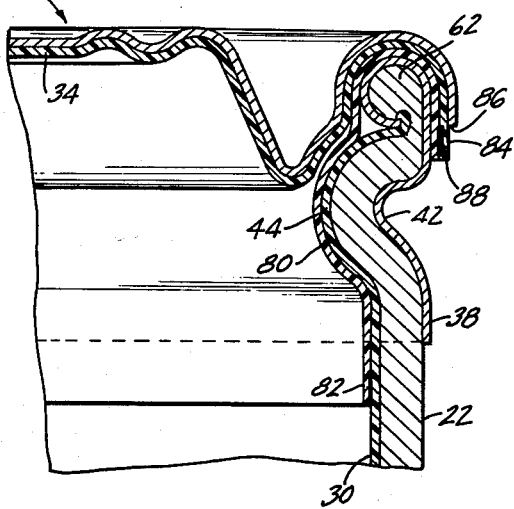
FIG. 11 is an enlarged sectional view of the upper end of the finished fiber drum having associated therewith a top closure or cover having a plastic seal, heat sealed, to the upper lining strip.
Figure 9:
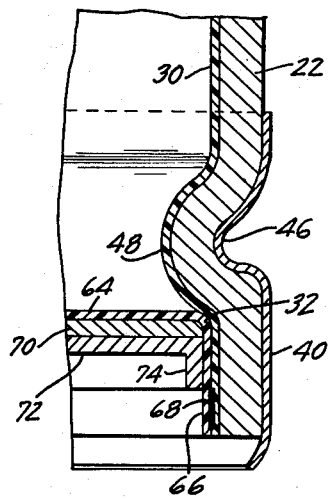
FIG. 9 is an enlarged fragmentary sectional view of the bottom of the fiber shell at such time as it receives the parts constituting the bottom closure, including the plastic head, prior to the bottom bead formation and chime construction.

Reference is now made to FIG. 11 wherein the top closure 26 having a preformed plastic cover seal 34 is shown as being employed to effectively close the top of the drum 20. The seal 34 is, however, extended to include the integral strip 84 extending downwardly beyond the peripheral edge 86 of the cover 26. Accordingly this strip 84 is adapted to be advantageously heat sealed to the associated surfaces of the sealing strip 80 along the zone 88. Thus, a further provision for a hermetically sealed plastic lined fiber drum is presented and when associated with a locking rim assembly 28 (see FIG. 1) optimum sealing of the top closure of the drum is possible.

An externally threaded central filling and emptying fitting may be provided on the top closure 26 for receiving a cap as is customarily done in the art to which our invention pertains. Where necessary a flexible and compressible gasket may be used where plastic elements are not ordinarily heat sealed together, as for example, at the juncture between the lining strip 80 and the cover seal 34.

As will be apparent from the foregoing, a plastic lined fiber drum is provided with effectively sealed seams which are capable of withstanding the use and abuse contemplated during shipping and storage. It will also be realized that the foregoing objects and advantages are most effectively obtained. Although a specific embodiment of our invention has been described and illustrated, various changes therein will become evident to one skilled in the art. Therefore our invention is to be determined by the scope of the appended claims.

We claim:

1. In the method of manufacturing plastic-lined fiber drums, the steps of: Initially providing a tubular shell made from laminated layers of fibrous material and having top and bottom ends, a lower reinforcing metal chime strip disposed around the shell at the bottom end thereof with the shell and lower chime strip being formed into an external groove and an internal shoulder extending completely around the drum a short distance from the lower peripheral edge of the bottom end thereof; lining the interior of said shell with a plastic liner such that said liner is in firm surface-to-surface contact with said shell and follows the contour of the interior thereof; placing a bottom closure having a plastic disk-shaped layer with a laterally extending depending apron, across the bottom end of said shell with said closure in abutting relationship with said internal shoulder and said apron in firm surface-to-surface contact with said liner adjacent the lower peripheral edge of the bottom end of the shell; sealing said apron with said liner adjacent the lower peripheral edge of said shell; and then pressing the lower end of the shell into a bead embraced by the bottom chime strip, with the sealed periphery of said apron and said liner anchored in the bead.

2. The invention in accordance with claim 1 wherein the lower periphery of the apron and the liner is heat sealed to prevent penetration and leakage of the contained material therethrough.

3. In the method of manufacturing plastic-lined fiber drums, the steps of: initially providing a tubular shell made from laminated layers of fibrous material and having a closed bottom and a top open end, an upper reinforcing metal chime strip disposed around the shell at the top end thereof with the shell and upper chime strip being formed into an external groove and an internal shoulder extending completely around the drum a short distance from the upper peripheral edge of the top end thereof; lining the interior of said shell with a plastic liner such that said liner is in substantially surface-to-surface contact with said shell and follows the contour of the interior thereof; placing a plastic lining strip on the top end of the shell such that it is disposed over said liner and on said internal shoulder; and sealing the lower periphery of said lining strip with said liner from unintentional loss of the contained material through this juncture.

4. The invention in accordance with claim 3 wherein the lower periphery of said lining strip is heat sealed to said liner to prevent unintentional loss of the contained material.

5. The invention in accordance with claim 3 wherein the top end of the shell is pressed to form a circumferentially extending bead at its upper periphery embraced by the upper chime strip; wrapping said lining strip around said bead; applying a top closure having a plastic seal across the shell open end such that said seal is in substantially tight surface-to-surface engagement with said lining strip; sealing said seal and said lining strip with respect to one another to prevent unintentional loss of the contained material between their juncture.

6. The invention in accordance with claim 5 wherein the lining strip and seal are heat sealed to one another to prevent unintentional loss of the contained material through their juncture.

7. In the method of manufacturing plastic-lined fiber drums, the steps of: initially providing a tubular shell made from laminated layers of fibrous material and having a bottom and top end, a reinforcing metal chime strip disposed around the shell at one end thereof with the shell and chime strip being formed into an external groove and an internal shoulder extending completely around the drum a short distance from the peripheral edge of said one end thereof; lining the interior of said shell with a plastic liner such that the liner is in substantially surface-to-surface contact with said shell and follows the contour of the interior thereof; placing an annular length of plastic of selected width in surface-to-surface contact with said liner adjacent the peripheral edge of the liner at said one end and heat sealing the peripheral edge of said liner to the length of plastic for hermetically sealing the juncture therebetween.

8. In a method of manufacturing plastic-lined fiber drums, the steps of: initially providing a tubular shell made from laminated layers of fibrous material and having top and bottom ends, a lower reinforcing metal chime strip disposed around the shell at the bottom end thereof with the shell and the lower chime strip being formed into an external groove and an internal shoulder extending completely around the drum a short distance from the lower peripheral edge of the bottom end thereof, and an upper reinforcing metal chime strip disposed around the shell at the top end thereof with the shell and upper chime strip being formed into an external groove and an internal shoulder extending completely around the drum a short distance from the upper peripheral edge of the top end thereof; lining the interior of said shell with a plastic liner such that said liner is in substantial surface-to-surface contact with said shell and follows the contour of the interior thereof; placing a bottom closure having a plastic disc-shaped layer with a laterally extending depending apron, across the bottom end of said shell with said closure in abutting relationship with the internal shoulder at the bottom end and said apron in firm surface-to-surface contact with said liner adjacent the lower peripheral edge of the bottom end of the shell; sealing said apron with said liner adjacent the lower peripheral edge of said shell; pressing the lower end of the shell into a bead embraced by the bottom chime strip, with the sealed periphery of said apron and said liner anchored in the bead; placing a plastic lining strip on the top end of the shell such that it is disposed over said liner and on the internal shoulder at the top end of the shell; and sealing the lower periphery of said lining strip with said liner from unintentional loss of the contained material through said juncture.

9. The invention in accordance with claim 8 wherein the sealing is accomplished by means of heat sealing the adjacent surfaces of the plastic material.

10. The invention in accordance with claim 8 wherein the top end of the shell is pressed to form a circumferentially extending bead at its upper periphery embraced by the upper chime strip; wrapping said lining strip around said bead; applying a top closure having a plastic seal across the shell open end such that said seal is in substantially tight surface-to-surface engagement with said lining strip; sealing said seal and said lining strip with respect to one another to prevent unintentional loss of the contained material between their juncture.

11. The invention in accordance with claim 10 wherein the sealing is accomplished by means of heat sealing the adjacent surfaces of the plastic material.

References Cited by the Examiner
UNITED STATES PATENTS

| | | | |
|---|---|---|---|
| 2,378,470 | 6/45 | Di Cosmo | 93—391 X |
| 2,727,673 | 12/55 | Berestrom | 229—55 |
| 2,884,176 | 4/59 | Carpenter et al. | 229—5.6 |
| 3,028,798 | 4/62 | Allen | 93—55.1 |

FRANK E. BAILEY, *Primary Examiner.*
BERNARD STICKNEY, *Examiner.*